United States Patent [19]
Yamahara et al.

[11] Patent Number: 5,517,343
[45] Date of Patent: May 14, 1996

[54] LCD DEVICE WITH POLYMERIC ELECTRODE EXTENDING INTO LC LAYER, AND METHOD OF MAKING

[75] Inventors: Motohiro Yamahara, Osaka; Toshiyuki Hirai, Kashihara; Shuichi Kohzaki, Nara, all of Japan

[73] Assignee: Sharp Kabushiki Kaisha, Osaka, Japan

[21] Appl. No.: 246,062

[22] Filed: May 20, 1994

[30] Foreign Application Priority Data

May 20, 1993 [JP] Japan .................................. 5-118714

[51] Int. Cl.$^6$ ...................... G02F 1/1337; G02F 1/1343; H01L 21/44
[52] U.S. Cl. .................. 359/75; 359/87; 437/180
[58] Field of Search .................. 359/87, 75, 58; 437/180, 181

[56] References Cited

U.S. PATENT DOCUMENTS

| | | | |
|---|---|---|---|
| 3,772,874 | 11/1973 | Lefkowitz | 359/87 |
| 3,877,790 | 4/1975 | Robinson | 359/79 |
| 4,699,804 | 10/1987 | Miyata et al. | 437/181 |
| 5,231,523 | 7/1993 | Nakaya et al. | 359/75 |

FOREIGN PATENT DOCUMENTS

| | | |
|---|---|---|
| 0150798A2 | 8/1985 | European Pat. Off. . |
| 59-7367B2 | 2/1984 | Japan . |

OTHER PUBLICATIONS

WPI Abstract Accession No. 91–350,602, abstracting Fujitsu Jap. publ. 3–235919A of 21 Oct.'91.
WPI Abstract Accession No. 91–350,603, abstracting Fujitsu Jap. publ. 3–235920A of 21 Oct.'91.
R. A. Soref, Sperry Research Center, "Field Effects in Nematic Liquid Crystals Obtained with Interdigital Electrodes," Jour. Appl. Physics, vol. 45, No. 12, pp. 5466–5468, Dec. 1974.

R. Kiefer et al., Fraunhofer–Institute, "In–Plane Switching of Nematic Liquid Crystals," *Japan Display '92*, pp. 547–550, 1992.

*Primary Examiner*—Anita Pellman Gross
*Assistant Examiner*—Walter Malinowski
*Attorney, Agent, or Firm*—David G. Conlin; Milton Oliver

[57] ABSTRACT

An object of the invention is to improve the display uniformity of a liquid crystal display apparatus and thereby make the viewing angle less problematic. A pair of first electrodes are formed on one of a pair of light transmitting substrates and a second electrode is formed on each of the first electrodes by polymerizing a conducting polymeric material thereon by the use of constant current electro-polymerization method so as to have a thickness almost equal to the liquid crystal layer thickness. The pair of the first electrodes and the second electrode formed thereon are used as display electrodes. An orientation film is formed on each of the one light transmitting substrate on which the display electrodes are formed and the other of the pair of light transmitting substrates, and thereby a pair of substrate members are formed. A liquid crystal layer is interposed between the substrate members. A polarizing plate is arranged on a side not-facing to the liquid crystal layer of the respective substrate members.

13 Claims, 9 Drawing Sheets

LCD DEVICE WITH POLYMERIC ELECTRODE EXTENDING INTO LC LAYER, AND METHOD OF MAKING

BACKGROUND OF THE INVENTION

1. Field of the Invention

The present invention relates to a liquid crystal display apparatus wherein a voltage is applied in a direction parallel to the surface of a pair of substrates sandwiching a liquid crystal layer, and a manufacturing method of the liquid crystal display apparatus.

2. Description of the Related art

Conventionally, a liquid crystal display apparatus using a nematic liquid crystal displaying element is widely employed for a numerical segment type display apparatus of watches, desk calculators, etc. The light transmitting substrate composing such liquid crystal displaying apparatus is provided with an active element as switching means for selectively driving a picture element electrode which applies a voltage to a liquid crystal. In addition to that, color filter layers of red, green, and blue colors are provided as color display means. The liquid crystal displaying types are classified in accordance with the twist angles of liquid molecules into an active drive type twisted nematic (hereinafter described as TN) liquid crystal displaying mode, where nematic liquid crystal molecules are oriented with a twist angle of 90°, and a multiple drive super twisted nematic (hereinafter described as STN) liquid crystal displaying mode, which takes advantage of a steep relationship between light transmittances and voltages applied to the liquid crystal by twisting the nematic liquid crystal molecules by 90° or more.

Since specific coloring is found in the latter multiplex drive STN type, an optical phase difference element is provided in the case where black-and-white displaying is conducted. The optical phase difference element is roughly classified into a two layers type double super twisted nematic liquid crystal displaying method and film added type liquid crystal displaying method. A liquid crystal cell for displaying and a liquid crystal cell oriented with a twist angle in a reverse direction are used in the former method. On the other hand, a film having optical anisotropy is arranged in the later method. In view of decreasing in weight and cost, the latter film added type liquid crystal displaying method is desirable.

On the other hand, the active drive-type TN liquid crystal displaying mode is roughly classified into a normally black mode, in which the polarizing directions of a pair of polarizing plates are arranged in parallel to each other and displaying is carried out in black color in a state that a voltage is not applied to a liquid crystal layer, and a normally white mode in which the polarizing direction thereof are arranged in perpendicular to each other and displaying is carried out in white color in an off-state. In view of the contrast of an image, the color reproducibility, and the dependence of an image on viewing angle, the normaly white mode is desirable.

However, the contrast of a displayed image varies depending on a viewing angle, and the dependence of the contrast on a viewing angle is high in the liquid crystal displaying apparatus employing the TN displaying mode because liquid crystal molecules have refractive anisotropy and are arranged with an inclination to the substrate. Particularly, a reversal phenomenon that black and white colors of an image is reversely observed occurs when a viewing angle formed by a viewing direction and a direction perpendicular to the image plane is beyond a certain angle.

In order to improve the dependence of the liquid crystal display apparatus on a viewing angle, the phase difference between the components of normal light and abnormal light is conventionally tried to be compensated by interposing between an element and a polarizing plate a phase difference plate (film) where the direction of one principal index of refraction is in parallel with a direction perpendicular to an image plane in the index ellipsoid. To use the phase difference plate, however, has a limitation in improving the reversal phenomenon of a black-and-white image.

Further, a liquid crystal displaying mode where a voltage is applied in parallel with a substrate surface has been proposed as another method for improving the viewing angle dependency by R. A. Sorer ( J. Appl. Phys. 45, 5466(1974)) and R. Kiefer et al. (JAPAN DISPLAY' 92 P2-30(1992)). Since a voltage is applied not in perpendicular to, but in parallel with the substrate surface in this liquid crystal display mode, the liquid crystal molecules do not incline to the substrate. Consequently, the viewing angle dependency is symmetrical in bilateral- and vertical-directions of the image plane in the case where the viewing angle is inclined from a normal line direction of the image plane.

Figure 11:
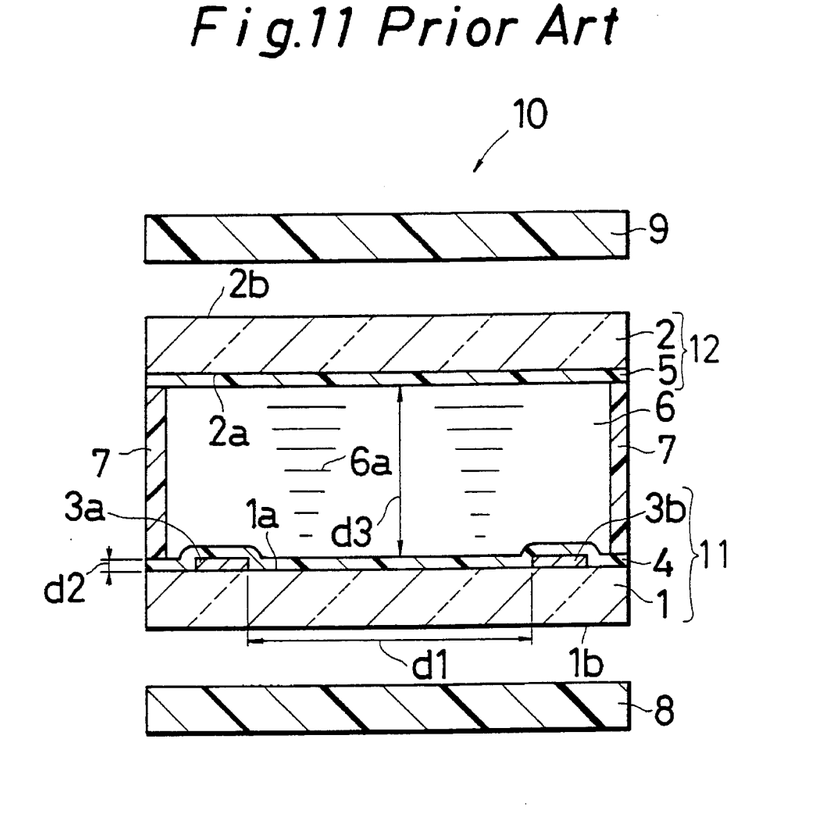
FIG. 11 is a sectional view of a conventional liquid crystal display apparatus 10 for showing the constitution thereof.

FIG. 11 is a sectional view showing a constitution of a conventional liquid crystal display apparatus 10. The liquid crystal display apparatus 10 comprises light transmitting substrates 1, 2, transparent electrodes 3a, 3b, orientation films 4, 5, a liquid crystal layer 6, an adhesive agent 7, and polarizing plates 8, 9. The transparent electrodes 3a, 3b practiced by a material such as indium tin oxide (ITO) are formed on a one surface 1a of a substrate 1 practiced by a material such as glass. For instance, a distance of about 10 μm is given as the distance d1 between the transparent electrodes 3a, 3b. A thickness d2 ranging from hundreds to thousands A is given as the thickness d2 between the transparent electrodes 3a, 3b. The orientation films 4, 5 are formed on the one surface 1a of the light transmitting substrate 1 where the transparent electrodes 3a, 3b are formed and on a one surface 2a of a transparent substrate 2, practiced by a material such as glass like the light transmitting substrate 1, respectively. The orientation films 4, 5 are practiced by a material such as a polyimide resin manufactured by JAPAN SYNTHETIC RUBBER CO. LTD., whose surface is treated by rubbing with a cloth threaded with, for instance, nylon fiber for orientation treatment. A one substrate member 11 comprises the light transmitting substrate 1, the transparent electrodes 3a, 3b and the orientation film 4, and the other substrate member 12 comprises the light transmitting substrate 2 and the orientation film 5.

One surface 1a of the light transmitting substrate 1 and one surface 2a of the light transmitting substrate 2 are arranged to face to each other, and are bonded to each other with the adhesive agent 7. A liquid crystal such as a nematic liquid crystal is injected between the substrate members 11, 12 to form the liquid crystal layer 6. For example, a thickness of about 5 μm is given as an example of the thickness d3 of the liquid crystal layer 6 and a refractive anisotropy of 0.0791 is given as an example of the reflective anisotropy Δn. The orientation direction of the orientation films 4, 5 formed on the light transmitting substrates 1, 2 are determined so that liquid crystal molecules 6a of the liquid crystal layer 6 interposed between the substrate members 11, 12 are oriented to be twisted by 90° between the substrate members 11, 12. The polarization plates 8, 9 are arranged on the other surfaces 1b, 2b of the light transmitting substrates 1, 2, respectively.

Figure 10:
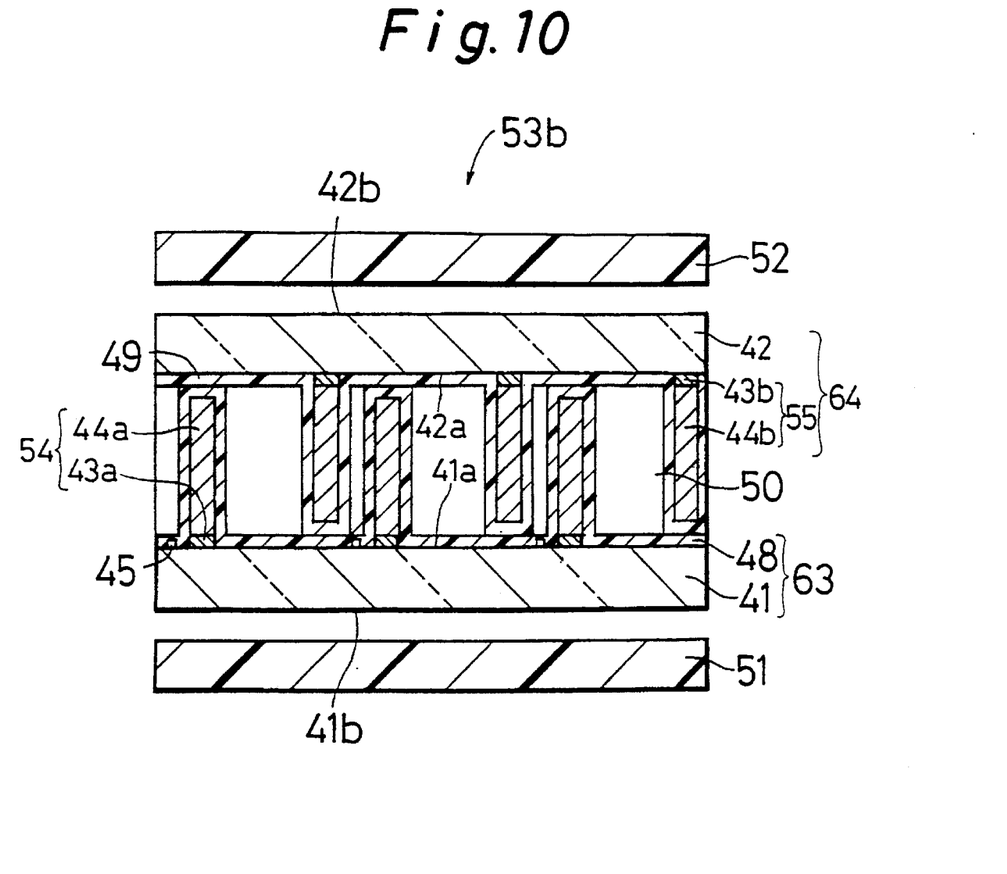
FIG. 10 is a sectional view of a liquid crystal display apparatus 53b made on the basis of yet other manufacturing method for showing the constitution thereof.
Figure 12:
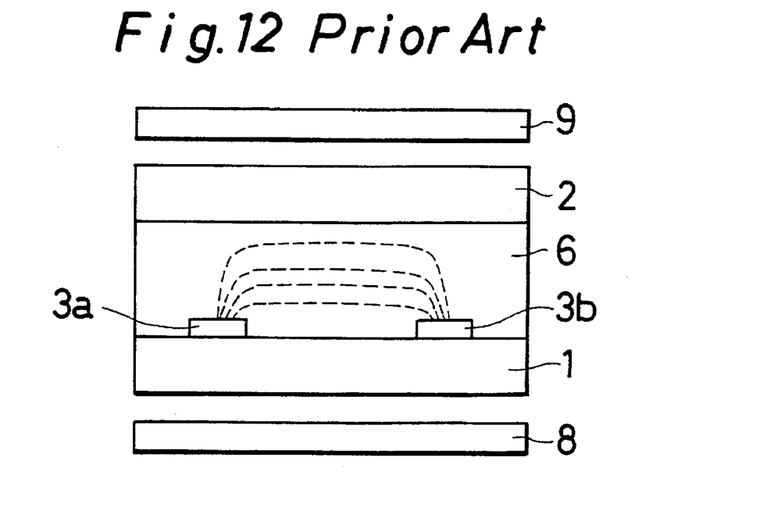
FIG. 12 is a view for explaining display principles of the liquid crystal display apparatus 10.

FIG. 12 is a view for explaining the displaying principles of the liquid crystal display apparatus 10. An electric field as shown by dashed lines of FIG. 10 is generated in the liquid crystal layer 6 by applying a voltage between the electrodes 3a, 3b of the liquid crystal display apparatus 10, and the liquid crystal molecules 6a are oriented along the electric field direction. For instance, the light incident through the polarizing plate 9 to the liquid crystal layer 6 when a voltage is not applied is twisted by 90 ° in a vibration direction by virtue of the liquid crystal molecules of the liquid crystal layer 6. The light outgoing from the liquid crystal layer 6 passes through the polarizing plate 8 and a white color is displayed. On the other hand, the light incident through the polarizing plate 9 to the liquid crystal layer 6, when a voltage is applied, outgoes from the liquid crystal layer 6 without being twisted in the vibration direction. The light which went out from the liquid crystal layer 6 is blocked and a black color is displayed.

The thickness d2 of the transparent electrodes 3a, 3b of the liquid crystal display apparatus 10 is very thin as compared that of the liquid crystal layer 6 arranged between the substrate members 11, 12. When a voltage is applied between such transparent electrodes 3a, 3b, the liquid crystal molecules 6a existing almost just above the electrode 3a, 3b are oriented nearly in perpendicular to the light transmitting substrates 1, 2, and the other liquid crystal molecules 6a are oriented nearly in parallel with the transparent substrates 1, 2. Consequently, the orientation of the liquid crystal molecules 6a are non-uniformly oriented, which causes non-uniform display and a decrease in image contrast. As a result, the image decreases in quality.

SUMMARY OF THE INVENTION

The object of the invention is to provide a liquid crystal display apparatus which can be easily manufactured and wherein an image with high uniformity and contrast can be obtained, and to provide a manufacturing method thereof.

The invention provides an improved crystal display apparatus in which a liquid crystal layer is interposed between a pair of substrate members, a predetermined region is used as a picture element, and the picture element is sandwiched in between a pair of display electrodes, wherein the improvement comprises the pair of display electrodes formed by being extended in a direction of a liquid crystal layer thickness.

The invention provides a liquid crystal display apparatus wherein any one of the pair of substrate members is the pair of display electrodes.

Further, the invention provides a liquid crystal display apparatus, wherein any one of the pair of substrate members has any one of the pair of display electrodes and another one of the pair of substrate members has another one of the pair of display electrodes.

Further, the invention provides a liquid crystal display apparatus, wherein each of the display electrodes is composed of a first electrode formed on a light transmitting substrate composing the substrate member and a second electrode extended in a direction of a liquid crystal layer thickness and the second electrode is made of a conducting polymeric material.

Further, the invention provides a liquid crystal display apparatus, wherein a length almost equal to the liquid crystal layer thickness is selected as a length of the second electrode formed by being extended in the direction of the liquid crystal layer thickness.

Further, the invention provides a liquid crystal display apparatus, wherein any one of the pair of substrate members comprises a switching element to be connected to a display electrode comprised in the one of the pair of substrate members.

Further, the invention provides a liquid crystal display apparatus, wherein each of the pair of substrate members comprises an orientation film to be in contact with the liquid crystal layer and an entire surface of the substrate members is covered with the orientation film.

Further, the invention provides a liquid crystal display apparatus, wherein each of the pair of substrate members comprises an orientation film to be in contact with the liquid crystal layer and a surface of each of the substrate members except a surface thereof on which a display electrode of each substrate member is formed is covered with the orientation film.

Further, the invention provides a manufacturing method of a liquid crystal display apparatus wherein a liquid crystal layer is interposed between a pair of substrate members and a predetermined region is used as a picture element, which comprises the steps for manufacturing any one of the pair of substrate members of:

forming on a light transmitting substrate a pair of first electrodes sandwiching a region corresponding to the predetermined region, forming a second electrode by polymerizing a conducting polymeric material on the first electrodes by the use of constant current electro-polymerization; and forming on each of the light transmitting substrates an orientation film, which to be in contact with the liquid crystal layer.

Further, the invention provides a manufacturing method of a liquid crystal display apparatus wherein a liquid crystal layer is interposed between any pair of substrate members and a predetermined region is used as a picture element, which comprises the steps for manufacturing a one of the pair of substrate members of:

forming on a light transmitting substrate comprised in the one of substrate members a one of a pair of first electrodes sandwiching a region corresponding to the predetermined region;

forming a one of a pair of second electrodes by polymerizing a conducting polymeric material on the one of the pair of first electrodes by the use of constant-current electro-polymerization method and forming on the light transmitting substrate an orientation film to be in contact with the liquid crystal layer, and the steps for manufacturing an other of the pair of substrate members of:

forming on another light transmitting substrate comprised in the other of substrate members an other of the pair of first electrodes;

forming an other of the pair of second electrodes by polymerizing a conducting polymeric material on the other of the pair of first electrodes by the use of constant current electro-polymerization method; and forming on the light transmitting substrate an orientation film to be in contact with the liquid crystal layer.

Still further, the invention provides a manufacturing method of a liquid crystal display apparatus, wherein the light transmitting substrates on which the first electrodes are formed are dipped in an electrolyte together with electrodes facing thereto and a conducting polymeric material is polymerized on the first electrodes by applying a voltage between each of the first electrodes and the electrode facing thereto.

Moreover, the invention provides a manufacturing method of a liquid crystal display apparatus, wherein the electrode contains a monomer of a conducting polymeric material, a solvent and a supporting electrolyte.

Additionally, the invention provides a manufacturing method of a liquid crystal display apparatus, wherein the orientation film is formed on entire surfaces of the first electrode, the second electrode and the light transmitting substrate.

Yet further, the invention provides a manufacturing method of a liquid crystal display apparatus, wherein the orientation film is formed on a surface of the light transmitting substrate except a surface thereof on which the first electrode is formed.

According to the invention, a liquid crystal display apparatus has a liquid crystal layer which is interposed between a pair of substrate members and a predetermined area of which is used as a picture element. A pair of display electrodes extended in a thickness direction of the liquid crystal layer are formed to sandwich the picture element. When a voltage is applied between the display electrodes, an electric field is generated in the liquid crystal layer. Since the display electrodes are formed to be extended in the thickness direction of the liquid crystal layer, the directions of the electric fields generated in the liquid crystal layer are uniform. Since the liquid crystal molecules of the liquid crystal layer are oriented to the direction of the electric field, the orientation uniformity of the liquid crystal molecules is improved, namely image uniformity and contrast are improved. Additionally, angle dependency is also improved, which results in the improvement of an image quality.

Further according to the invention, the pair of display electrodes can be formed on any one of a pair of substrate members.

Further according to the invention, one of a pair of display electrodes can be formed on one of a pair of substrate members and the other of the pair of display electrodes can be formed on the other of the pair of substrate members. Since wirings for the respective display electrodes can be carried out on the different substrates, no insulation layer is necessary between the display electrodes wirings, which makes it easy to wire for the display electrodes. Additionally, one of the pair of substrate members is constructed in the same manufacturing processes as that of the other of the substrate members.

Further according to the invention, the display electrode is composed of a first electrode formed on the light transmitting substrate of the substrate member and a second electrode which is formed of conducting polymeric material to be extended in a thickness direction of the liquid crystal layer. The first electrode can be used as a signal wiring and the second electrode can be used as an electrode having direct relation to displaying. The second electrode made of conducting polymeric material is formed by the use of a method such as constant-current electro-polymerization method. The thickness uniformity of the liquid crystal layer is improvised by virtue of extending the second electrode in the thickness direction of the liquid crystal layer. Consequently the image uniformity is also improved.

Further according to the invention, a length almost equal to that of the liquid crystal layer is given as the length of the second electrode in the thickness direction of the liquid crystal layer. The thickness uniformity of the liquid crystal layer is improved and additionally, when a voltage is applied, the uniformity of the generated electric field is improved and the orientation uniformity of the liquid crystal molecules is further improved. Consequently, the uniformity and contrast of an image are further improved, which result in remarkably improving the quality of the image. Moreover, a spacer arranged between the pair of substrate members can be eliminated. Still further impact and pressure resistances are improved in the liquid crystal display apparatus.

Further according to the invention, a switching element is formed on one of the pair of light transmitting substrates and a display electrode formed on the one of the light transmitting substrates is connected to the switching element. Consequently, a voltage is applied to the liquid crystal layer by the use of the switching element, and thereby it is made possible to conduct active driving where a display electrode as a picture element is selectively driven.

Further according to the invention, a pair of first electrodes are formed on the light transmitting substrates of the one of the substrate members, and a second electrode is formed on the first electrode by polymerization of a conducting polymeric material in a constant-current electro-polymerization method. Still further, according to the invention, one of the first electrodes is formed on the light transmitting substrate of the one of the substrate members, the other of the first electrodes is formed on the light transmitting substrate of the other of the substrate members, and the second electrodes are formed on the first electrodes by polymerization of a conducting polymeric material in the constant-current electro-polymerization method.

When polymerization of a conducting polymeric material is conducted in the constant-current electro-polymerization method, the conducting material is polymerized on an electrode made of a material such as ITO or platinum. Therefore, such materials are selected for the first electrode. The second electrode can be formed on only a desired area by masking an area where the second electrode is unnecessary. The ITO or platinum is formed into an electrode material by a method such as vaporization method. The electrode material having a thickness almost equal to that of the liquid crystal layer can not be formed because of the limitation owned by the manufacturing method of vaporization.

It is possible to form a film for a relatively short time and at a relatively low cost by employing the constant-current electro-polymerization method. Additionally, the film thickness can be easily controlled, for instance, by changing the polymerization conditions, and can be formed relatively thick as compared with that in the vaporization method. Consequently, an image of improved quality can be obtained and a display electrode can be easily formed.

Further according to the invention, the polymerization of the conducting polymeric material by the constant-current electro-polymerization method comprises processes of dipping the light transmitting substrate on which the first electrode is formed and an electrode opposite to the first electrode into an electrolyte and applying a voltage between the first electrode and the opposite electrode. When the method being used, the second electrode having a predetermined thickness can be formed by suitably selecting an electric current density, polymerization time, etc.

According to the invention, the electrolyte comprises a monomer, a solvent, and a supporting electrolyte, and a desired conducting polymeric material can be polymerized by selecting a predetermined material.

Further according to the invention, each of a pair of substrate members has an orientation film to be in contact with the liquid crystal layer. The orientation state of liquid crystal molecules is restricted by the orientation film when a voltage being not applied. The entire surface of the substrate member is covered with the orientation film. For example, the entire surface of the first electrode formed on the light transmitting substrate, the second electrode, the light transmitting substrate is covered with the orientation film. Thus, since the orientation film is formed on the entire surface, the orientation film material can be applied by the use of a relatively simple method such as spin coating method. Accordingly, the liquid crystal display apparatus can be effectively manufactured.

Still further according to the invention, the surface of the substrate member except the surface on which the display electrode of the substrate member is formed is covered with the orientation film. For example, the surface of the light transmitting substrate except the surface on which the first electrode is formed is covered with the orientation film. More specifically, only a just very small part of the display electrode surface is covered with the orientation film, but the almost surface of the display electrode is not covered with the orientation film. It is assumed that, when the entire surface of the display electrode is covered with the orientation film, the orientation state of the liquid crystal molecules is fallen into disorder because the display electrode is formed to be extended in a liquid crystal thickness direction. In the invention, however, it is not assumed that the orientation state is fallen into disorder when a voltage is not applied. This is because an almost entire surface of the display electrode is not covered with the orientation film. Accordingly the image uniformity is improved when a voltage is not applied. The formation of such an orientation film can be practiced by a method such as printing method.

BRIEF DESCRIPTION OF THE DRAWINGS

Other and further objects, features, and advantages of the invention will be more explicit from the following detailed description taken with reference to the drawings wherein:

FIG. 2 is a view for explaining displaying principles of the liquid Crystal display apparatus 31a;

FIG. 9B is a perspective view of he liquid crystal display apparatus 53a.

DETAILED DESCRIPTION OF THE PREFERRED EMBODIMENTS

Now referring to the drawings, preferred embodiments of the invention are described below.

Figure 1:
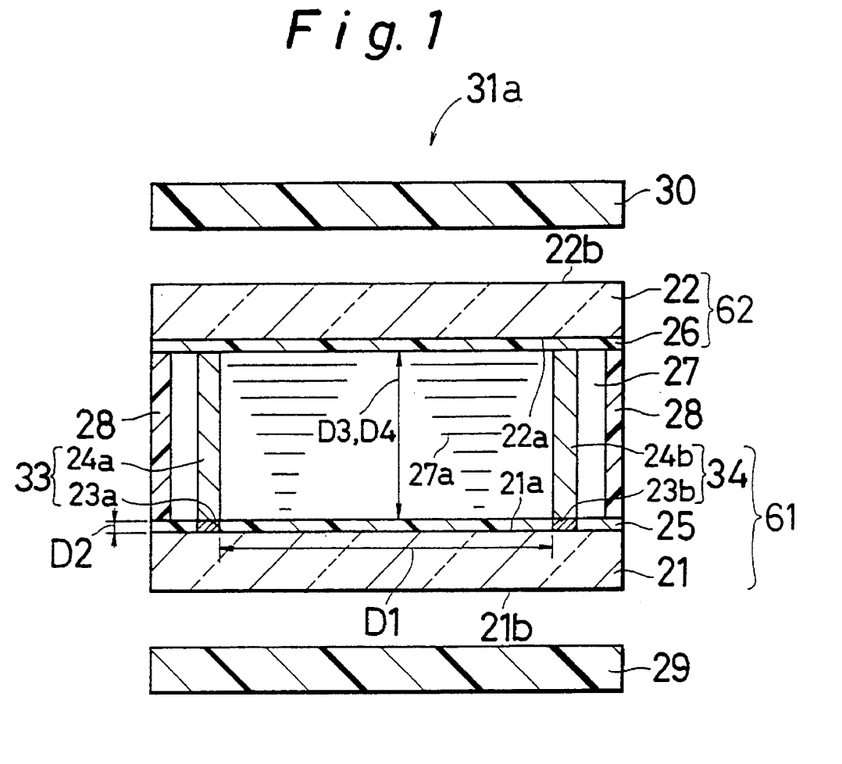
FIG. 1 is a sectional view of a first embodiment of a liquid crystal display apparatus 31a of the invention for showing the constitution thereof.

FIG. 1 is a sectional view of a first embodiment of a liquid crystal display apparatus 31a of the invention for showing the constitution thereof.

The liquid crystal display apparatus 31a comprises a pair of substrate members 61, 62, a liquid crystal layer 27, and polarization plates 29, 30. The one substrate member 61 includes a light transmitting substrate 21, an orientation film 25 and display electrodes 33, 34, and the other substrate member 62 includes a light transmitting substrate 22 and an orientation film 26. A liquid crystal layer 27 is interposed between the pair of substrate members 61, 62. The display subelectrodes 33, 34 comprise first electrodes 23a, 23b and second electrodes 24a, 24b, respectively.

The first electrodes 23a, 23b are formed on a one surface 21a of the light transmitting substrate 21 realized by a material such as glass. The first electrodes 23a, 23b are realized by a transparent electrode material such as ITO and are used as anodes in forming the second electrodes 24a, 24b made of conducting polymeric material by the below-mentioned constant-current electro-polymerization method. For example a distance of about 10 μm is selected as the distance D1 between the first electrodes 23a, 23b. As the thickness of the electrodes 23a, 23b is selected, for example, a thickness almost equal to that of the below-mentioned orientation film 25, and more specifically, for example, a thickness of hundreds to thousands Å. The second electrodes 24a, 24b made of conducting polymeric material such as polythiophene, polythienylenevinylene, polyaniline and polypyrrole are formed on the first electrodes 23a, 23b, respectively. The second electrodes 24a, 24b are formed by the below-mentioned constant current electro-polymerization method to have a thickness D3 (a length in a thickness direction of the liquid crystal layer) of about 5 μm. The first electrodes 23a, 23b and the second electrodes 24a, 24b are used as display electrodes, and more specifically, the first electrodes 23a, 23b are used for signal wirings and the second electrodes 24a, 24b used as electrodes having direct relation to displaying.

The orientation film 25 is formed on the one surface 21a of the light transmitting substrate 21 excepting the region of the one surface 21a on which the display electrodes 33, 34 are formed. On the other hand, the orientation film 26 is formed on the entire of one surface 22a of the light transmitting substrate 22 realized by a material such as glass like the light transmitting substrate 21. The orientation state of the liquid crystal molecules 27a, when a voltage being not applied, is controlled by the orientation films 25, 26. The orientation films 25, 26 are formed by applying a polyimide resin, for example, produced by JAPAN SYNTHETIC RUBBER CO., LTD., on the substrates using a printing method, and treating the surfaces by rubbing with a cloth threaded with nylon or the like.

The orientation films 25, 26 formed on the light transmitting substrates 21, 22 are arranged to face to each other, and bonded with an adhesive agent 28. Between the substrate members 61, 62 is injected a nematic liquid crystal to form a liquid crystal layer 27. A thickness of about 5 μm is selected as the thickness D4 of the liquid crystal layer 27, and as the refractive anisotropy Δn of the liquid crystal layer 27 is selected, for example, 0.0791. The direction of orientation treatment of the orientation films 25, 26 are arranged so that the liquid crystal molecules 27a of the liquid crystal layer 27 interposed between the substrates members 61, 62 are arranged with a twist of about 90° between the substrate members 61, 62. The polarization plates 29, 30 are arranged on the other surfaces 21b, 22b of the light transmitting substrates 21, 22, respectively.

Figure 2:
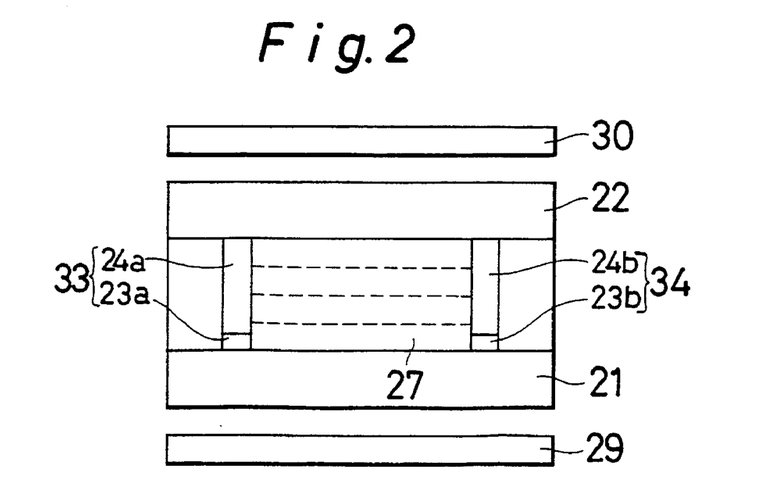

FIG. 2 is a view for explaining displaying principles of the liquid crystal display apparatus 31a. The second electrodes 24a, 24b used as the display electrodes 33, 34, respectively, are formed to have a thickness D3 almost equal to the thickness D4 of the liquid crystal layer 27. Consequently, an electric field generated in the liquid crystal layer 27, when a voltage is applied between the display electrodes 33, 34, is parallel with the light transmitting substrates 21, 22, as is shown by dashed lines of FIG. 2. Therefore, the liquid crystal molecules 27a of the liquid crystal layer 27 are oriented to be parallel with the light transmitting substrates 21, 22.

When a voltage is not applied, for example, the light incident into the liquid crystal layer 27 through the polarizing plate 30 is rotated by 90° in a vibration direction by virtue of the liquid crystal molecules 27a of the liquid crystal layer 27 which are twist-oriented by 90°. Since the light outgoing after the rotation in the vibration direction thereof passes through the polarization plate 29, a white color image is displayed.

On the other hand, when a voltage is applied, the light incident into the liquid crystal layer 27 through the polarizing plate 30 goes out without the rotation in the vibration direction by virtue of the liquid crystal molecules 27a which are oriented to be parallel with the light transmitting substrates 21, 22. The outgoing light blocked and therefore a black color image is displayed.

Figure 3:
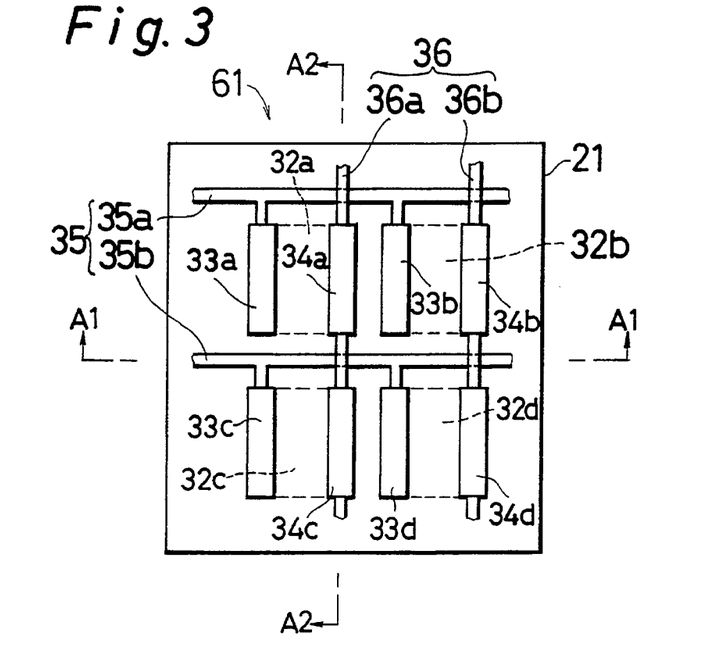
FIG. 3 is a plan view of a substrate member 61 comprising display electrodes 33a–33d, 34a–34d.

FIG. 3 is a plan view of a substrate member 61 comprising a plurality of display electrodes 33a–33d and 34a–34d. A plurality of rectangular picture elements 32a–32d are provided in a matrix form on the light transmitting substrate 21. For example, a pair of display electrodes 33a, 34a are formed for the picture element 32a to sandwich the picture element 32a. In a similar manner, a pair of display electrodes 33b, 34b are formed for the picture element 32b to sandwich the picture element 32b, a pair of display electrodes 33c, 34c are formed for the picture element 32c to sandwich the picture element 32c, and a pair of display electrodes 33d, 34d are formed for the picture element 32d to sandwich the picture element 32d. The plurality of display electrodes 33a–33d and 34a–34d are formed to be parallel with each other and are connected to a plurality of display electrode wirings 35, 36, respectively. Though a 2×2 picture element is described in order to simplify the description in the embodiment, the constitution for a one picture element is the same.

In FIG. 3, a one display electrode 33a for the picture element 32a is connected to a display electrode wiring 35a. Additionally, a one display electrode 33b for the picture element 32b laterally adjacent to the picture element 32a is also connected to the display electrode wiring 35a. As to the picture elements 32c, 32d which are provided in another lateral line parallel with the lateral line of the picture elements 32a, 32b, a one display electrode 33c for the picture element 32a and a one display electrode for the picture element 32b are connected to an other display electrode wiring 35b which is provided to be parallel with the display electrode wiring 35a. Additionally, as shown in FIG. 3, the other display electrodes 34a, 34c for the picture elements 32a, 32c which are provided in a vertical line are connected to a display electrode wiring 36a which is provided to be at right angles to the display electrode wirings 35a, 35b. As to the picture elements 32b, 32d which are provided in other vertical line, the other display electrodes 34b, 34d for the picture elements 32b, 32d, respectively, are connected to the other display electrode wiring 36b which is provided so as to be parallel with the display electrode wiring 36a. The two display electrode wirings 35a, 35b are arranged to be parallel with each other, and the two display electrode wirings 36a, 36b are arranged to be at right angles with the display electrode wirings 35a, 35b.

When the display electrode wiring 35a is selected, a voltage is supplied to the display electrodes 33a, 33b. When the display electrode wiring 36b which is at right angles with the display electrode wiring 35a is selected, a voltage is supplied to the display electrodes 34a, 34c. Consequently, a voltage is applied between the pair of display electrodes 33a, 34a for the picture element 32a. Since the liquid crystal molecules 27a between the display electrodes 33a, 34a are oriented along a direction of an electric field generated by applying a voltage, incident light is blocked and a black color image is displayed. Since a voltage is not applied to the pairs of display electrodes 33b–33d and 34b–34d for the picture elements 32b–32d excluding the selected picture element 32a, the liquid crystal molecules 27a of these picture elements 32b–32d are oriented along an orientation direction of the orientation films 25, 26 formed on the light transmitting substrates 21, 22, respectively. Consequently, the incident light passes through the liquid crystal layer 27 and a white color image is displayed.

Thus, the plurality of display electrode wirings 35a, 35b are successively selected and simultaneously the plurality of display electrode wirings 36a, 36b which are at right angles with the display electrode wirings 35a, 35b are selected or not, thereby so-called single matrix drive type displaying is carried out.

Figure 4A:
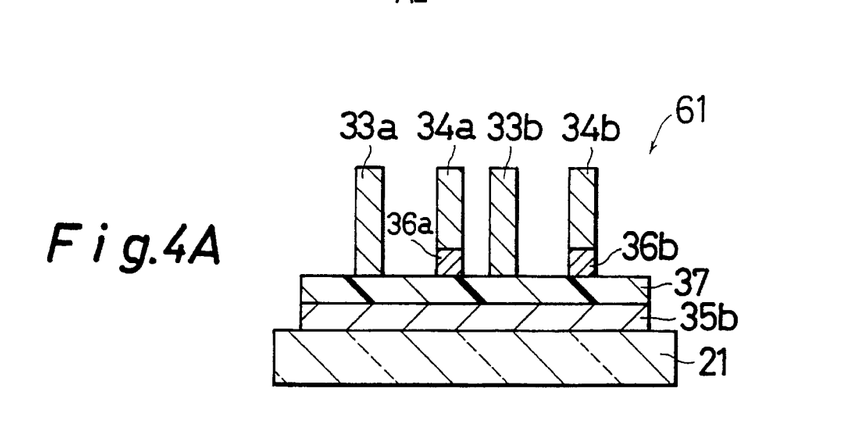
FIG. 4A is a sectional view of the substrate member 61 taken along line A1—A1 in FIG. 3.
Figure 4B:
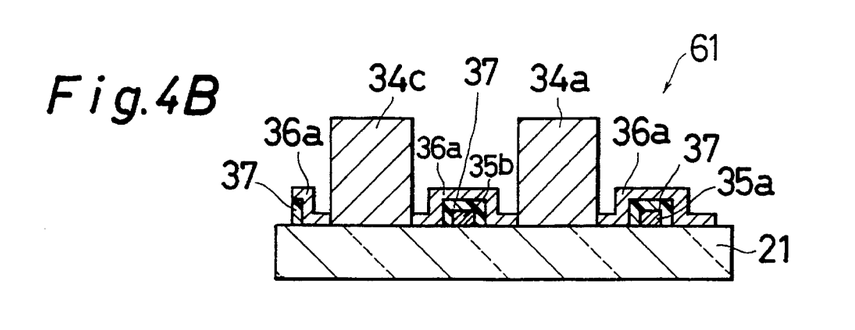
FIG. 4B is a sectional view of the substrate member 61 taken along line A2—A2 in FIG.3.

FIG. 4A is a sectional view of the substrate member 61 taken along line A1—A1 in FIG. 3, and FIG. 4B is a sectional view of the substrate member 61 taken along line A2—A2 in FIG. 3. In the case where the single matrix drive method is employed, contacting the display electrode wiring 35 with the display electrode wiring 36 which is at right angles with the display electrode wiring 35 causes a short circuit. Consequently, an image of good quality is not attainable. In order to eliminate the problem, an insulation layer is provided between the display electrode wiring 35 and the display electrode wiring 36 in the case where the pair of display electrodes 33, 34 are arranged on the same light transmitting substrate 21 as shown in the embodiment. Thus, the display electrode wirings 35, 36 are insulated from each other.

Figure 5:
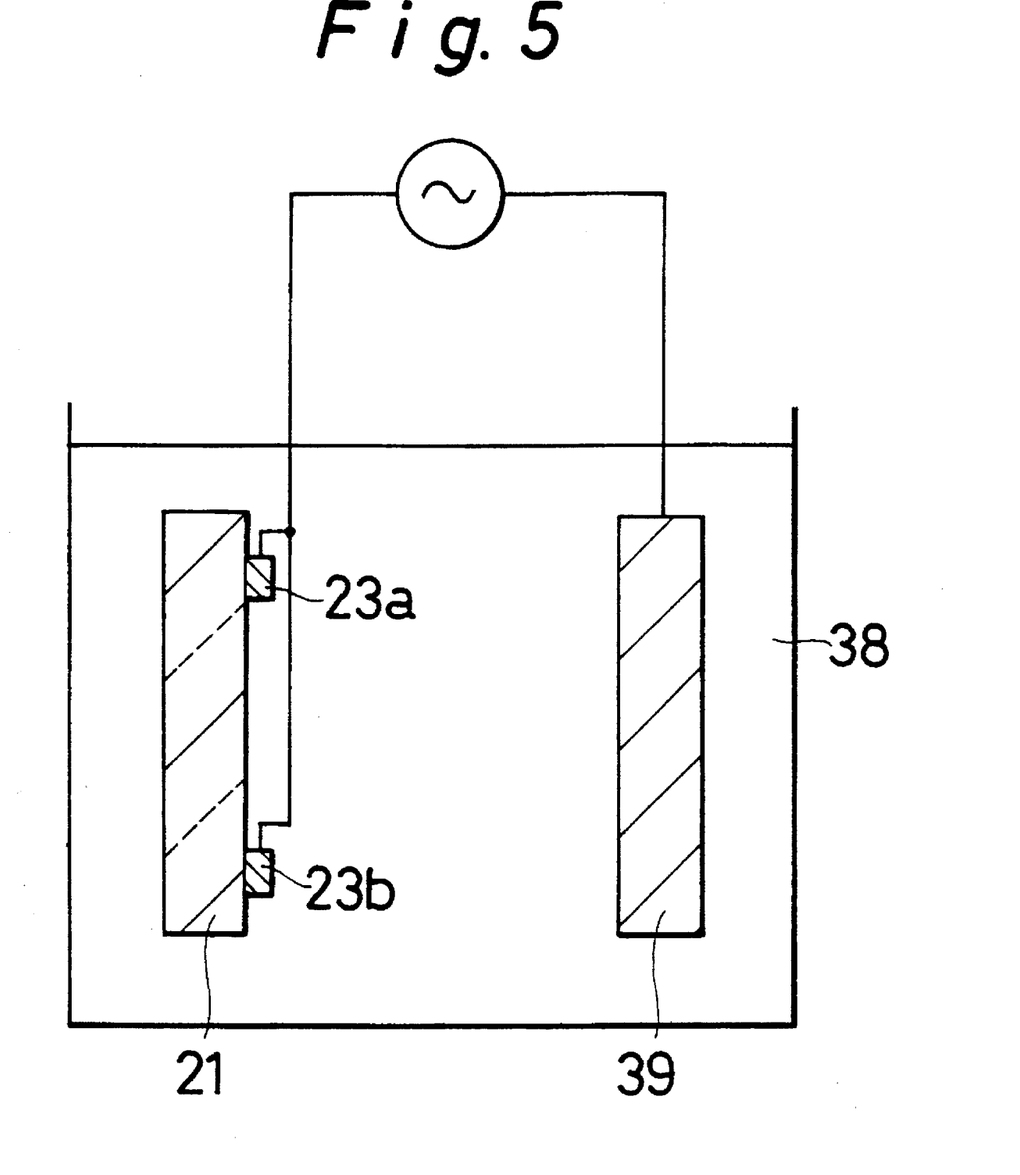
FIG. 5 is a sectional view for explaining a constant current electro-polymerization method.

FIG. 5 is a sectional view for explaining a constant-current electro-polymerization method which is applied for forming conducting polymeric films as the second electrodes 24a, 24b. In the constant-current electro-polymerization method, a voltage is applied between a pair of electrodes dipped in an electrolyte. An electrode 39, and a light transmitting substrate 21 on which the first electrodes 23a, 23b are formed are dipped in an electrolyte 38. The electrolyte 38 comprises a monomer of at least one selected among thiophene, thienylene vinylene, aniline, pyrrole or the like, a solvent of at least one selected among nitrobenzene, acetonitrile and water, and a supporting electrolyte realized by tetrabutylammonium perchlorate or the like. The electrode 39 is realized by platinum or the like. When a voltage is applied utilizing the first electrodes 23a, 23b formed on the light transmitting substrate 21 as anode and the electrode 39 as cathode, a conducting polymeric layer is polymerized on the first electrodes 23a, 23b. An electric current density of about 0.6 mA/c$^m$ is used in the voltage application in the embodiment. After the polymerization of conducting polymeric layer, the polymeric layer was dedoped by dilute aqueous ammonium in the embodiment.

Though the display electrodes 33a, 33b can be made of only electrode material composed of inorganic substances, such electrode material is usually made by a method such as vapor deposition which takes a lot of time and causes increase of the manufacturing cost as a necessary consequence. Additionally, it is difficult to control the film thickness and further to form a relatively thick film in the vapor deposition method. For instance, when a ITO film is formed using the vapor deposition method, it is difficult to form one having a thickness of more than 2,000A. This is because it is necessary to heat the formed film in order to enhance the adhesion thereof with a substrate and the method of crystallization and deposition of ITO deposited requires a lot of time to form a thick film.

As the embodiment, when a conducting polymeric layer is employed as the second electrodes 24a, 24b, a film having a thickness of a few µm can be formed in a few minutes and at room temperature by employing the above-described constant current electro-polymerization method. The constant current polymerization method extremely decreases the manufacturing cost as compared with the vapor deposition method. Additionally, the film thickness can be easily controlled by suitably selecting the polymerization conditions such as electric current density of an applied voltage or polymerization time.

As to the conducting polymeric layer obtained in such manner, it is possible to have a conductivity similar to that of metal, semiconductor, or nonconductor by suitably selecting a conducting polymeric material or doping conditions.

Figure 6:
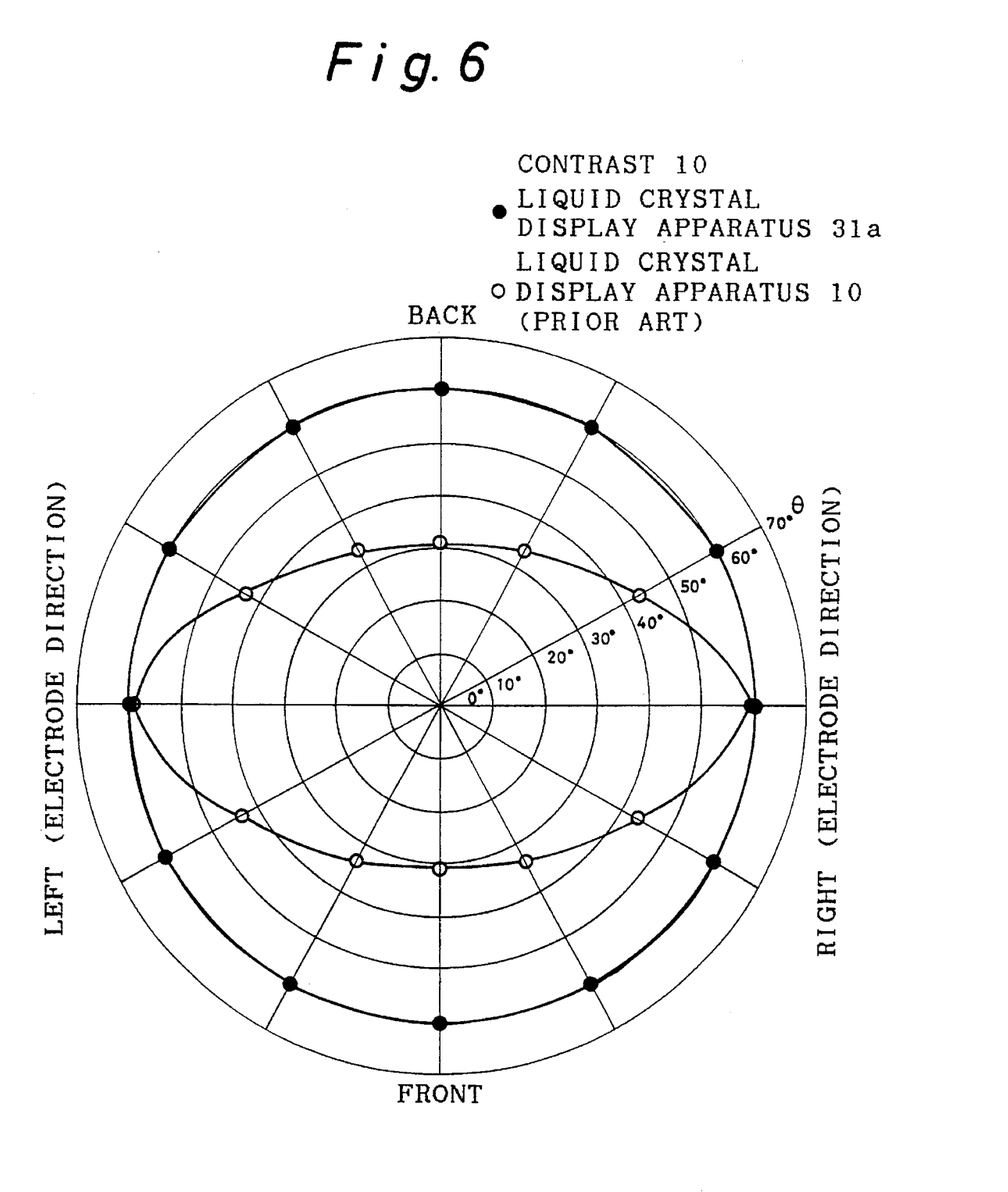
FIG. 6 shows isocontrast curves of liquid crystal display apparatuses 31, 10.

FIG. 6 shows isocontrast curves of a liquid crystal display apparatus 31a of the embodiment, and a conventional liquid crystal display apparatus 10 of a comparison example. The right and left direction in FIG. 6 shows the direction in which electrodes are formed. An angle θ shows the angle which is formed by a viewing direction and a normal line of a image plane. A contrast of 10 can be obtained at an angle θ of 60° in both the right and left direction and the back and front direction of the horizontally installed image plane in the embodiment 31a. On the other hand, in the conventional liquid crystal display apparatus 10 a contrast of 10 can be obtained at an angle θ of 60° in a right and left direction like the embodiment 31a, however, at 30° in a back and front direction. It was demonstrated that the reversal of black and white colors does not occur at the time of applying a voltage in the embodiment 31a. Additionally, it was demonstrated from observations with a polarization microscope that the problem of non-uniformity of an image in the prior art can be eliminated in the liquid crystal display apparatus 31a. In the conventional liquid crystal display apparatus 10, the non-uniformity of a displayed image is caused. It was confirmed from observations with a polarization that the non-uniformity is found in particular in the region of the electrodes. Thus it was demonstrated that a wider visual angle and a uniform and high contrast of an image can be obtained in the liquid crystal display apparatus 31a of the embodiment as compared with the conventional liquid crystal display apparatus 10.

Though an example that both of a pair of display electrodes 33, 34 are formed on a light transmitting substrate is explained in the embodiment, an embodiment that the display electrodes 33, 34 are formed on different light transmitting substrates 21, 22, respectively, belongs to the scope of the invention. One display electrode 33 may be formed on one light transmitting substrate 21, and the other display electrode 34 may be formed on the other light transmitting substrate 22. The converse is also possible.

Figure 7A:
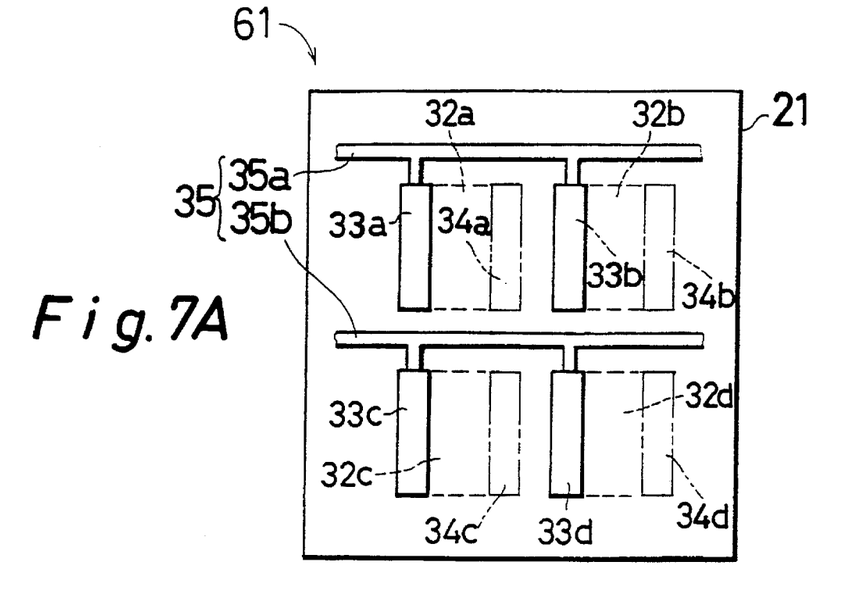
FIG. 7A is a plan view of a substrate member 61 made on the basis of other manufacturing method.
Figure 7B:
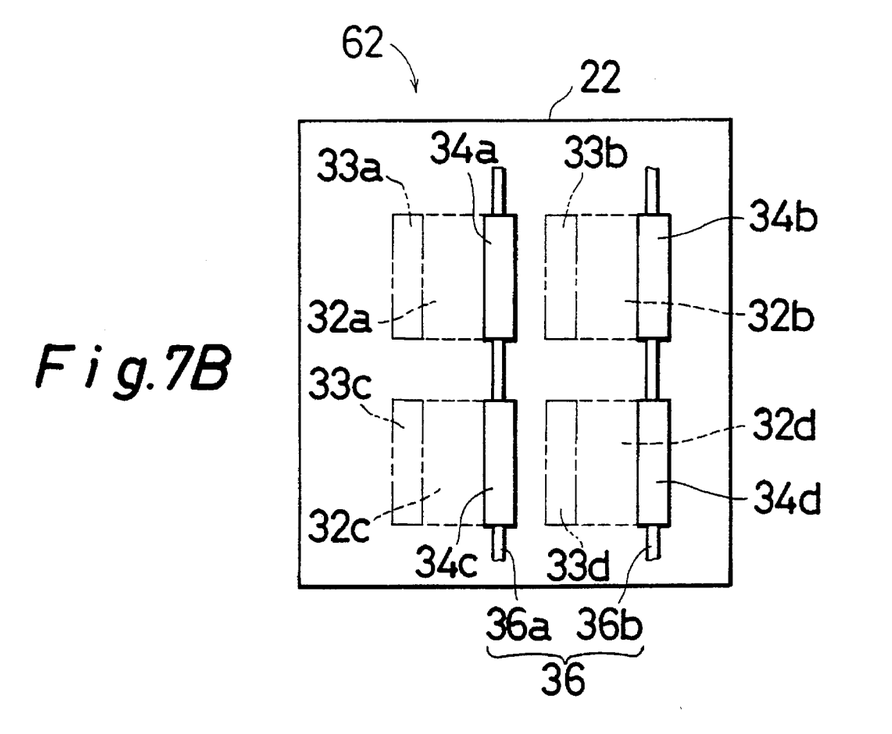
FIG. 7B is a plan view of a substrate member 62.

FIG. 7A is a plan view of a substrate member 61 wherein the display electrodes 33a–33d on the one side are formed on the one light transmitting substrate 21, and FIG.7B is a plan view of a substrate member 62 wherein the display electrodes 34a–34d on the other side are formed on the other light transmitting substrate 22. When the display electrodes 33a–33d and the display electrodes 4a–34d which make a pair are formed on the different light transmitting substrates 21, 22, respectively, an insulating layer 37 for insulating the display wirings 35, 36 making a right angle with each other from each other is not required because the display wirings 35a, 35b to be connected with the display electrodes 33a–33d and the display wirings 36a, 36b to be connected with the display electrodes 34a–34d are respectively formed on the different light transmitting substrates 21, 22. That makes it easy to form display electrode wirings. The occurrences of image non-uniformity in the cases where the display electrodes are formed on a single substrate and are formed on different substrates are shown in Table 1. A film thickness D3 (length in a direction of a liquid crystal layer thickness) of the second electrode 24a, 24b is varied in the range from 2 µm to 5 µm. The thickness D4 of the liquid crystal layer 27 is fixed at about 5 µm as mentioned above.

TABLE 1

| film thickness D3 of second electrodes | image non-uniformity formation of electrode | |
| --- | --- | --- |
| 24a, 24b | single substrate | different substrates |
| 5 µm | not observed | not observed |
| 4 µm | not observed | not observed |
| 3 µm | not observed | observed |
| 2 µm | observed | observed |

In the case where the display electrodes are formed on a single substrate, image non-uniformity was not observed in the case of a film thickness D3 of 3 µm or more. However, image ununiformity was observed in the case of a film thickness of 2 µm.

On the other hand, in the case where the electrodes are formed on the different substrates, image non-uniformity was not observed in a film thickness of 4 µm or more and was observed in that of 3 µm or less. Consequently, it is preferable that the thickness D3 of the second electrodes 24a, 24b is selected to be almost equal to that of the liquid crystal layer 27.

Figure 8:
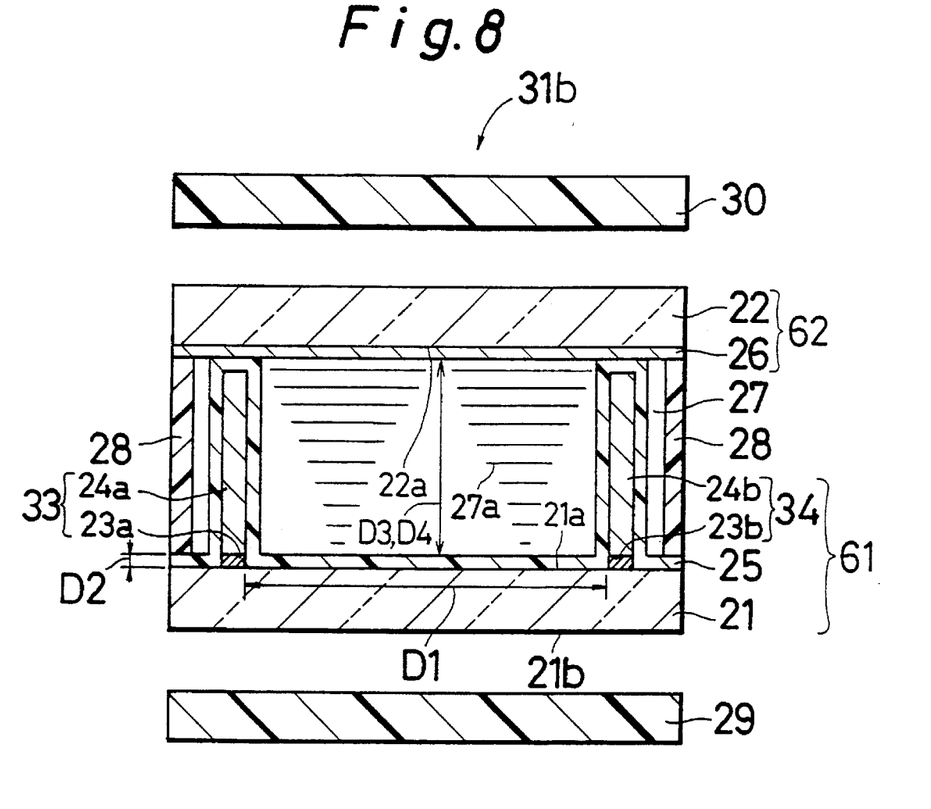
FIG. 8 is a sectional view of a liquid crystal display apparatus 31b made on the basis of still other manufacturing method for showing the constitution thereof.

FIG. 8 is a sectional view of a liquid crystal display apparatus 31b made on the basis of other manufacturing method for showing the constitution thereof. Though the liquid crystal display apparatus 31b is made in the same manner as that of the liquid crystal display apparatus 31a, the orientation film 25 is characterized in that it is formed on the surface 21a of the light transmitting substrate 21 except the region where the display electrodes 33, 34 are formed and the entire surface of the display electrodes 33, 34. The same reference numerals as those of the liquid crystal display apparatus 31a are used for the members in the same constitution as that of the liquid crystal display apparatus 31a. Since the orientation film of the liquid crystal display apparatus can be formed in the relatively simple manner of spin coating method, the liquid crystal display apparatus 31$b$ can be effectively manufactured. However, degradation of image quality such as decrease of image uniformity or contrast, decrease of viewing angle may be caused. This is because the orientation state of the liquid crystal molecules 27$a$ in the vicinity of the display electrodes 33, 34 and in the vicinity of the light transmitting substrate 21 is not uniform due to the formation of the orientation film on the entire surface of the display electrodes 33, 34 when a voltage is not applied.

On the other hand, in the case of the liquid crystal display apparatus 31$a$, it is only the surface of the first electrodes 23$a$, 23$b$ and the surface 21$a$ of the light transmitting substrate 21 that are coated with the orientation film 25 and the orientation film 25 are not formed on the surface of the second electrodes 24$a$, 24$b$. Consequently, the non-uniformity of the liquid crystal molecules 27$a$ as mentioned above is not caused and there is no possibility of decrease of image uniformity, image contrast or viewing angle.

Additionally, though a dedoping treatment was applied to the conducting polymeric layer used as the second electrodes 24$a$, 24$b$ of the liquid crystal display apparatus 31$a$, it is possible to apply a doping treatment. A bipolaron band and a polaronband are generated in the conducting polymeric molecules by applying the doping treatment. The bipolaron band and polaron band are generated between the valence band and the conduction band and any one of the two is led to a stable state by the conducting polymeric molecules. The band width of the bipolaron band or polaron band can be controlled by selecting the concentration at the time of the doping treatment. The conducting polymeric molecules present conductive property.

On the other hand, the bipolaron band and the polaron band disappear by applying the dedoping treatment. Therefore the conducting polymeric molecules are made nonconductive. Additionally, it is possible to make the conducting polymeric molecules semiconductive by selecting the doping conditions.

For example, when the surface of the display electrodes 33, 34 is covered with the orientation film 25$a$ as shown in FIG. 1, the second electrodes 24$a$, 24$b$ may be relatively high conductive. However, when the surface of the second electrodes 24$a$, 24$b$ is not covered with the orientation film 25$a$, the second electrodes 24$a$, 24$b$ are preferably semiconductive.

Furthermore, referring to FIG. 3, it is achieved to enhance an image quality at the time of applying a voltage by providing light shielding means such as black mask between the display electrodes 34$a$, 33$b$ facing each other in picture elements adjacent to each other, for example, 32$a$, 32$b$. More specifically, when a voltage is applied, it is considered that a voltage is also applied between the display electrodes 34$a$, 34$b$ and the orientation of the liquid crystal molecules 27$a$ existing between the electrodes is varied. The variation of the orientation may adversely affect images to be displayed. However, since the images between the electrodes are always displayed as black color, the variation of orientation of liquid crystal molecules 27$a$ does not adversely affect the images to be displayed.

Figure 9A:
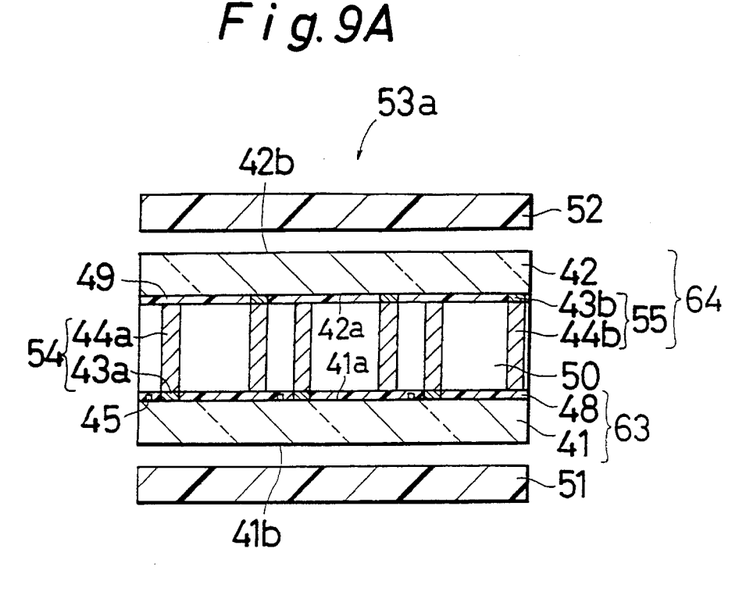
FIG. 9A is a sectional view of a second embodiment of a liquid crystal display apparatus 53a of the invention for showing the constitution thereof.
Figure 9B:
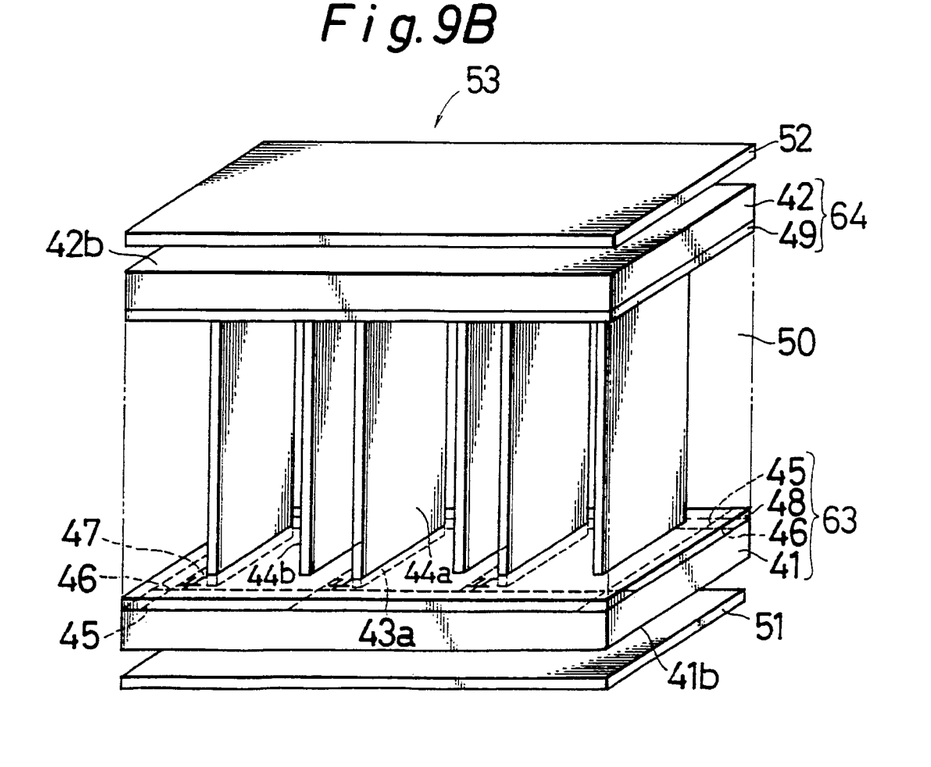

FIG. 9A is a sectional view of a second embodiment of a liquid crystal display apparatus 53$a$ of the invention for showing the constitution and FIG. 9B is a perspective view of the liquid crystal display apparatus 53$a$.

The liquid crystal display apparatus 53$a$ comprises a pair of substrate members 63, 64, a liquid crystal layer 50, and polarization plates 51, 52. One substrate member 63 of the pair of substrate members 63, 64 comprises a light transmitting plate 41, a source bus wiring 45, gate bus wiring 46, a thin film transistor (TFT) element 47, an orientation film 48 and a picture element electrode 54, and the other substrate member 64 of the pair of substrate members 63, 64 comprises a light transmitting substrate 42, an orientation film 49 and an electrode 55 opposite to the electrode 54. The liquid crystal layer 50 is interposed between the pair of substrate members 63, 64. The picture element electrode 54 comprises a first electrode 43$a$ and a second electrode 44$a$, and the opposite electrode 55 comprises a first electrode 43$b$ and a second electrode 44$b$.

A plurality of source bus wirings 45 are formed in parallel with one another on one surface 41$a$ of the light transmitting substrate 41 realized by a material such as glass. A plurality of gate bus wirings 46 are formed in a direction perpendicular to the source bus wirings 45. The source bus wirings 45 and the gate bus wirings 46 are formed to be insulated from each other. A plurality of regions formed by crossing the source bus wirings and the gate bus wirings are used as picture elements on each of which a TFT element 47 as a switching element is formed. The TFT element 47 is realized by a material such as a-SiTFT or p-SiTFT. On each picture element is formed the first electrode 43$a$ realized by a material such as ITO. Further, on the first electrode 43$a$ is formed the second electrode 44$a$ realized by a conducting polymeric layer. The first electrode 43$a$ and the second electrode 44$a$ are picture element electrodes 54.

The opposite electrode 55 opposite to the picture electrode 54 is formed in a region which is on one surface 42$a$ of the light transmitting substrate 42 realized by a material such as glass and is corresponding to the picture element. More specifically, the first electrode 43$b$ realized by a material such as ITO is formed on the surface 42$a$ of the light transmitting substrate 42 and on the first electrode 43$b$ is formed the second electrode 44$b$ realized by a conducting polymeric layer like the second electrode 44$a$. The first electrodes 43$a$, 43$b$ and the second electrodes 44$a$, 44$b$ of the embodiment are formed in the same manner as that of the first electrodes 23$a$, 23$b$ and the second electrodes 24$a$, 24$b$ of the foregoing embodiment. A distance of about 10 μm is selected as a distance between the picture element electrode 54 and the opposite electrode 55 formed on one picture element.

The orientation films 48 is formed on the one surface 41$a$ of the light transmitting substrate 41 on which the source bus wiring 45, the gate bus wiring 46, the TFT element 47 and the picture element electrode 54 are formed. The orientation film 48, however, is not formed on the region of the one surface 41$a$ of the light transmitting substrate 41 where the picture element electrode 54 is formed. Further the orientation film 49 is formed on the one surface 42$a$ of the light transmitting substrate 42 on which the opposite electrode 55 is formed. The region of the surface 42$a$ where the opposite electrode is formed is also excepted from forming the orientation film 49. The orientation films 48, 49 are arranged to be opposite to each other. A distance of 5 μm is selected as an example of the distance between the light transmitting substrates 41, 42. The liquid crystal layer 50 like the liquid crystal layer 27 of the foregoing embodiment is interposed between the members 63, 64. The polarization plates 51 is arranged on the side of the other surface 41$b$ of the light transmitting substrate 41 and the polarization plate 52 arranged on the side of the other surface 42$b$ of the light transmitting substrate 42. The liquid crystal display apparatus 53 made in this manner is one of an active matrix drive type. It was demonstrated that a wider range of a viewing angle and an uniform image with a high contrast can be also achieved in the liquid crystal display apparatus 53.

FIG. 10 is a sectional view of a liquid crystal display apparatus 53b made on the basis of still other manufacturing method for showing the constitution. The liquid crystal apparatus 53b is made in a similar manner to that of the liquid crystal display apparatus 53b mentioned above. The orientation film 48 is formed on the one surface 41a of the light transmitting substrate 41 on which the source bus wiring 45, the gate bus wiring 46, the TFT element 47 and the picture element electrode 54 are formed. The orientation film, however, is formed not only on the surface 41a of the light transmitting substrate 41, but also on the entire surface of the picture element electrode 54. Likewise, the orientation film 49 is formed not only on the surface 42a of the light transmitting substrate 42, but also on the entire surface of the opposite electrode 55. The same reference numerals are used in FIG. 10 for the same members as those of the liquid crystal display apparatus 53b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An improved liquid crystal display apparatus in which
   a liquid crystal layer, having a thickness, is interposed between
   a pair of substrate members,
   a predetermined region is used as a picture element, and the picture element is sandwiched in between
   a pair of display electrodes,
   wherein said display electrodes each extend substantially through the thickness of said liquid crystal layer;
   and wherein each of the display electrodes is composed of
   a first subelectrode formed on a light-transmitting one of said substrate members and
   a second subelectrode, formed of a conducting polymeric material, and extending from said first subelectrode, through said liquid crystal layer, toward an opposing one of said substrate members.

2. A liquid crystal display apparatus of claim 7, wherein an arbitrarily selected one of the pair of substrate members supports the pair of display electrodes, and a height of each second subelectrode, normal to said substrate members, is within a range from 60% to 100% of the thickness of the liquid crystal layer.

3. A liquid crystal display apparatus of claim 1, wherein a first one of the pair of substrate members supports one of the pair of display electrodes and a second one of the pair of substrate members supports the other one of the pair of display electrodes, and a height of each second subelectrode, normal to said substrate members, is within a range from 80% to 100% of the thickness of the liquid crystal layer.

4. A liquid crystal display apparatus of claim 1, wherein
   a height almost equal to the liquid crystal layer thickness is selected as a height of the second electrode, formed by being extended in the direction of the liquid crystal layer thickness.

5. A liquid crystal display apparatus of claim 1, wherein an arbitrarily selected one of the pair of substrate members further comprises a switching element which is connected to one of the display electrodes formed on that one of the pair of substrate members.

6. A liquid crystal display apparatus of claim 1, wherein each of the pair of substrate members comprises an orientation film in contact with the liquid crystal layer which covers an entire liquid crystal adjacent surface of each substrate member.

7. A liquid crystal display apparatus of claim 1, wherein each of the pair of substrate members comprises an orientation film in contact with the liquid crystal layer and a liquid-crystal-adjacent surface of each of the substrate members, except a portion thereof on which a display electrode of each substrate is formed, is covered with the orientation film.

8. A method of manufacturing a liquid crystal display, wherein
   a liquid crystal layer is interposed between
   a pair of substrate light-transmitting substrates, and
   a predetermined region is used as a picture element, which comprises the steps of:
   forming, on a light-transmitting substrate, a pair of first subelectrodes sandwiching a region corresponding to the predetermined region,
   forming a second subelectrode by polymerizing a conducting polymeric material onto each of the first subelectrodes by use of constant-current electro-polymerization; and
   forming, on each of the light-transmitting substrates, an orientation film in contact with the liquid crystal layer.

9. A method of manufacturing a liquid crystal display, wherein a liquid crystal layer is interposed between a pair of light-transmitting substrates members, and
   a predetermined region is used as a picture element, which comprises the steps of:
   forming, on a first light-transmitting substrate, one of a pair of first subelectrodes sandwiching a region corresponding to the predetermined region,
   forming one of a pair of second subelectrodes by polymerizing a conducting polymeric material on the one of the pair of first subelectrodes, by the use of constant-current electro-polymerization; and
   forming, on the first light-transmitting substrate, an orientation film in contact with the liquid crystal layer,
   and the steps of:
   forming, on the other light-transmitting substrate, the other of the pair of first subelectrodes,
   forming the other of the pair of second subelectrodes by polymerizing a conducting polymeric material on the other of the pair of first subelectrodes, by the use of constant-current electro-polymerization; and
   forming, on the second light-transmitting substrate, an orientation film in contact with the liquid crystal layer.

10. A manufacturing method of a liquid crystal display apparatus of claim 8 or 9, wherein the light transmitting substrates on which the first electrodes are formed are dipped in an electrolyte together with electrodes facing thereto and a conducting polymeric material is polymerized on the first electrodes by applying a voltage between each of the first electrodes and the electrode facing thereto.

11. A manufacturing method of a liquid crystal display apparatus of claim 10, wherein the electrolyte contains a monomer of a conducting polymeric material, a solvent and a supporting electrolyte.

12. A manufacturing method of a liquid crystal display apparatus of claim 8 or 9, wherein the orientation film is formed on entire surfaces of the first electrode, the second electrode and the light transmitting substrate.

13. A manufacturing method of a liquid crystal display apparatus of claim 8 or 9, wherein the orientation film is formed on a surface of the light transmitting substrate except a surface thereof on which the first electrode is formed.

* * * * *